United States Patent [19]

Genini et al.

[11] 4,256,146

[45] Mar. 17, 1981

[54] FLEXIBLE COMPOSITE TUBE

[75] Inventors: Maurice Genini, Creteil; Christian Athe, Le Mee; Jean-Paul Aubert, Puteaux, all of France

[73] Assignee: Coflexip, Ruell Malmaison, France

[21] Appl. No.: 13,178

[22] Filed: Feb. 21, 1979

[30] Foreign Application Priority Data

Feb. 21, 1978 [FR] France ................ 78 04885

[51] Int. Cl.³ .................................. F16L 9/18
[52] U.S. Cl. ................... 138/111; 138/130; 138/139; 174/47; 174/95
[58] Field of Search ............... 138/111, 115, 116, 117, 138/130, 131, 133, 134, 139, 153; 174/47, 95, 96, 97; 285/131, 137 R

[56] References Cited

U.S. PATENT DOCUMENTS

| 1,141,067 | 5/1915 | Lloyd | 138/111 |
| 2,578,280 | 12/1951 | Barnard | 138/111 X |
| 2,844,939 | 7/1958 | Schultz | 138/111 X |

FOREIGN PATENT DOCUMENTS 162224  4/1903  Fed. Rep. of Germany .... 174/95

Primary Examiner—James E. Bryant, III
Attorney, Agent, or Firm—Cushman, Darby & Cushman

[57] ABSTRACT

A composite flexible tube is disclosed. The central portion of the core of the tube is formed of a plurality of hollow elements dipsosed concentrically about the longitudinal axis of the tube.

4 Claims, 2 Drawing Figures

FLEXIBLE COMPOSITE TUBE

The present invention is directed to a composite flexible tube. Notably in the petroleum industry, composite tubes are currently used for conducting an electrical current and/or fluids used for feeding and driving immerged equipment.

Such composite tubes comprise an internal zone, generally formed of an elastomeric material which contain various diverse electrical conduction lines or fluid transport means. These tubes usually include a bracing which offers a certain resistance to pressure, as well as a watertight sleeve or sheath. It is also necessary to provide an internal layer of resistance to radial crushing to avoid damage to the lines of electrical transport or fluid conduits contained in the interior of the tube.

Such structures are relatively complex and thus very costly.

The present invention proposes to realize in a relatively simple and economic manner, a composite flexible tube of great length, offering excellent characteristics of mechanical resistance, notably to radial pressure.

The present invention has for an object an industrial product which is new and is a composite flexible tube characterized by the fact that it comprises a watertight external tubular sheath; at least a sheet of bracing; and a central alveolar tube formed from a plurality of hollow metal elements each having a cross-section which appears triangular, each disposed side by side in a manner such that the line of intersection of the apex of each hollow metal element extends along the longitudinal axis of the tube, and each hollow metal element being made of a folded unsoldered metal band or sheet.

Materials which may be used for making the hollow metal elements according to the invention, include, by way of example, steel sheet metal, aluminum and its alloys and appropriate plastic materials, for example, Rilsan.

In a preferred embodiment, the hollow metal elements, disposed side by side, are identical and have an angle at the apex equal to 60°, the face of the hollow metal element opposite to the angle of the apex being curved, preferably in the arc of a circle.

Thus a tubular central zone can be formed by disposing side by side six of such hollow metal elements.

Preferably, the hollow metal elements are wound in a helix with an angle of winding of preferably about 25°.

In order to illustrate the invention, examples of the invention will be described with reference to the appended drawings in which.

Figure 1:
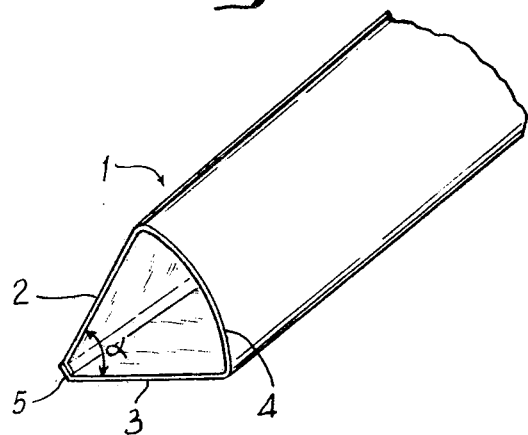
FIG. 1 represents in perspective a section of a hollow metal element useful in accordance with the invention.

In FIG. 1, the hollow metal element 1 can be made of, for example, aluminum and has a transverse section which is triangular.

The angle "alpha" of the apex is of about 60°, defined by two faces 2, 3; the face 4 of the hollow metal element opposite to the angle alpha is curved in the arc of a circle. Each of the faces 2 and 3 carries a folded (turned down) edge 5 at the apex angle, the two edges being applied one to the other.

The hollow metal element 1 can be produced in great length by simply folding up a metallic band, without soldering, in a manner to realize the structure represented in FIG. 1.

Figure 2:
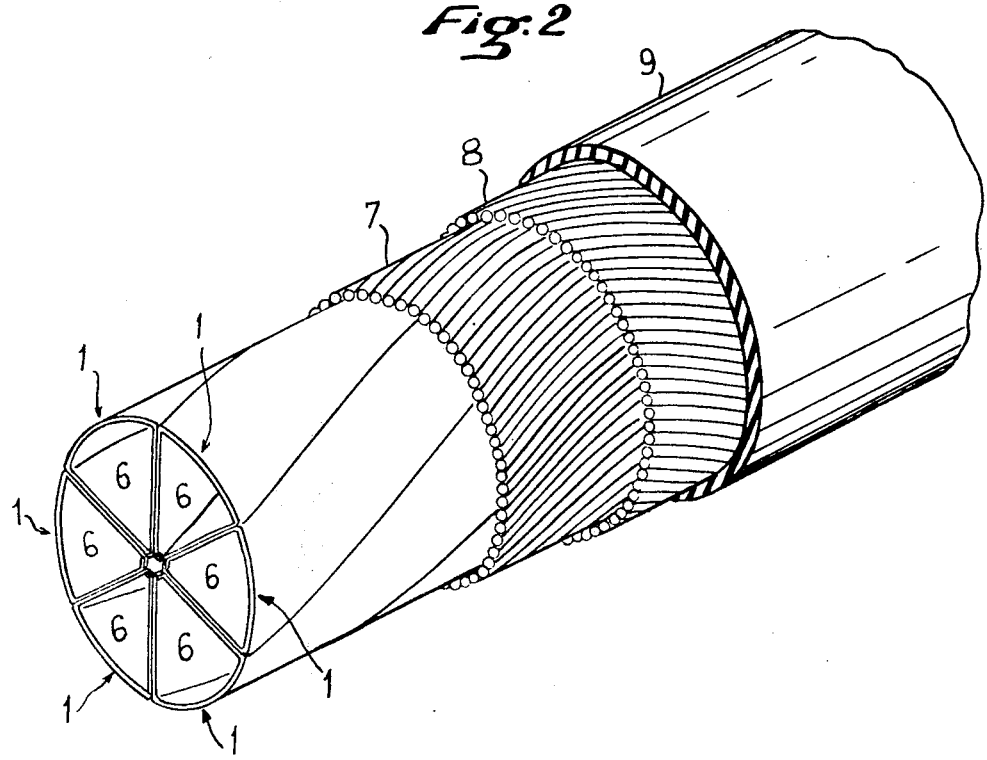
FIG. 2 represents a perspective of view of the composite flexible tube in accordance with the invention.

In FIG. 2, a flexible composite tube is presented in which the internal tubular central part is formed by juxtaposing six identical hollow metal elements, such as represented in FIG. 1. These six hollow metal elements are disposed in such a manner that the lines of intersection of the apex of each extends along the longitudinal axis of the tube.

As can be seen in FIG. 2, the hollow metal element 1 is wound in a helix in the longitudinal direction of the tube. The external faces 4 of the hollow metal tubes 1 are curved in the arc of a circle, whereby the central part of the tube has a continuous external surface which appears to be cylindrical.

As can be seen from examination of FIG. 2, the structure thus realized forms six alveoli 6, having seemingly triangular transverse section which can contain a great number of lines, for example, for fluid and electrical transport, according to the uses envisaged for the tube.

Because of the fact that the hollow metal elements, which are disposed in a certain array at the line of intersection of the apexes at edges 5 are not soldered to each other, faces 2 and 3 can adapt themselves to form a framework which provides an important resistance to forces in the radial direction.

It is thus not necessary to provide a skeleton which itself resists crushing or forces in the radial direction.

The tube represented in FIG. 2 is completed by two sheets 7 and 8 of metallic threads, each of which are wound in a helix to confer good resistance to axial traction to compensate for the induced torsional forces, and a watertight external tubular sheet 9 made, for example, of polyamides such as those sold under the commercial name of Rilsan.

The invention has been described in accordance with a preferred embodiment, and it is thus evident that it is not limited in any way by the foregoing description and is meant to embrace numerous modifications, notably of form and materials, without departing from the spirit of the invention.

What is claimed is:

1. A composite flexible tube comprising a central alveolar element, an external watertight sheath, and a sheet of metal between said central alveolar element and said external watertight sheath, wherein said central alveolar element comprises a plurality of hollow metal elements, the cross-section of each of the hollow metal elements having the appearance of a triangle, wherein each hollow metal element is disposed side by side, whereby the line of intersection of each apex of each hollow metal element extends along the longitudinal axis of the tube, and wherein each of the hollow metal elements is formed of a folded, unsoldered metal sheet, said hollow metal elements being wound in a helix.

2. The tube according to claim 1, wherein each of the hollow metal elements is identical and wherein each has an angle at the apex of about 60°.

3. The tube according to claim 2, wherein the face of each hollow metal element opposite to said angle at the apex is curved in an arc of a circle.

4. The tube according to claim 1, wherein the angle of winding the hollow metal elements is about 25°.

* * * * *